(12) United States Patent
Yokoyama et al.

(10) Patent No.: US 8,841,395 B2
(45) Date of Patent: Sep. 23, 2014

(54) METHOD FOR PRODUCING A WATER-ABSORBENT RESIN

(75) Inventors: Hideki Yokoyama, Himeji (JP); Sachi Kikuno, Kurobe (JP); Atsushi Heguri, Himeji (JP); Nobuhiro Maeda, Himeji (JP)

(73) Assignee: Sumitomo Seika Chemicals Co., Ltd., Kako-gun (JP)

( * ) Notice: Subject to any disclaimer, the term of this patent is extended or adjusted under 35 U.S.C. 154(b) by 0 days.

(21) Appl. No.: 13/812,612

(22) PCT Filed: Jul. 20, 2011

(86) PCT No.: PCT/JP2011/066453
§ 371 (c)(1),
(2), (4) Date: Jan. 28, 2013

(87) PCT Pub. No.: WO2012/014747
PCT Pub. Date: Feb. 2, 2012

(65) Prior Publication Data
US 2013/0123454 A1    May 16, 2013

(30) Foreign Application Priority Data
Jul. 28, 2010  (JP) .................................. 2010-169680

(51) Int. Cl.
| | |
|---|---|
| C08F 2/18 | (2006.01) |
| C08F 220/06 | (2006.01) |
| C08F 2/32 | (2006.01) |
| B01J 20/26 | (2006.01) |
| C08F 2/10 | (2006.01) |

(52) U.S. Cl.
CPC ................. *C08F 2/10* (2013.01); *C08F 220/06* (2013.01); *C08F 2/18* (2013.01); *C08F 2/32* (2013.01); *B01J 20/261* (2013.01)
USPC ....................................... 526/317.1; 526/319

(58) Field of Classification Search
CPC ................ C08F 2/18; C08F 2/32; C08F 2/10; C08F 220/06; C08F 222/1006; C01J 20/261
USPC .............................................. 526/317.1, 319
See application file for complete search history.

(56) References Cited

U.S. PATENT DOCUMENTS

| | | | |
|---|---|---|---|
| 5,652,309 A | | 7/1997 | Itoh et al. |
| 2007/0015887 A1 | | 1/2007 | Yoshino et al. |
| 2009/0036855 A1 | | 2/2009 | Wada et al. |
| 2009/0169891 A1 | | 7/2009 | Higashimoto et al. |
| 2009/0182092 A1* | | 7/2009 | Yokoyama et al. ............ 524/850 |
| 2009/0281247 A1 | | 11/2009 | Handa et al. |
| 2010/0331802 A1* | | 12/2010 | Yokoyama et al. ............ 604/372 |

FOREIGN PATENT DOCUMENTS

| | | |
|---|---|---|
| EP | 2 184 300 A1 | 5/2010 |
| JP | 61-87702 A | 5/1986 |
| JP | 61-087702 A | 5/1986 |
| JP | 62-172006 A | 7/1987 |
| JP | 3-195709 A | 8/1991 |
| JP | 03-195709 A | 8/1991 |
| JP | 3-195713 A | 8/1991 |
| JP | 03-195713 A | 8/1991 |
| JP | 09-012613 A | 1/1997 |
| JP | 2006-068731 A | 3/2006 |
| JP | 2006-089525 A | 4/2006 |
| JP | 2006-342306 A | 12/2006 |
| WO | 03/051939 A1 | 6/2003 |
| WO | WO 03051939 A1 * | 6/2003 |
| WO | 2004/101628 A1 | 11/2004 |
| WO | 2007/123188 A1 | 11/2007 |
| WO | 2007/126002 A1 | 11/2007 |
| WO | 2009/025235 A1 | 2/2009 |

OTHER PUBLICATIONS

International Search Report for PCT/JP2011/066456, mailing date of Sep. 13, 2011.
International Search Report of PCT/JP2011/066455, mailing date of Sep. 13, 2011.
International Search Report of PCT/JP2011/066454, mailing date of Sep. 13, 2011.
International Search Report for PCT/JP2011/066453, mailing date of Aug. 16, 2011.
Translation of the International Preliminary Report on Patentability (PCT/IB/338) (1 page), (PCT/IB/373) (1 page) of International Application No. PCT/JP2011/066453 mailed Mar. 21, 2013 (Form PCT/ISA/237) (6 page).
Translation of the International Preliminary Report on Patentability (PCT/IB/338) (1 page), (PCT/IB/373) (1 page) of International Application No. PCT/JP2011/066455 mailed Mar. 21, 2013 (Form PCT/ISA/237) (4 page).
International Preliminary Report on Patentability (PCT/IB/326) (1 page), (PCT/IB/373) (1 page) of International Application No. PCT/JP2011/066456 mailed Feb. 7, 2013 (Form PCT/ISA/237) (3 pages) (Japanese Only).
Translation of the International Preliminary Report on Patentability (PCT/IB/338) (1 page), (PCT/IB/373) (1 page) of International Application No. PCT/JP2011/066454 mailed Mar. 21, 2013 (Form PCT/ISA/237) (4 page).

(Continued)

*Primary Examiner* — Michael M Bernshteyn
(74) *Attorney, Agent, or Firm* — Westerman, Hattori, Daniels & Adrian, LLP

(57) ABSTRACT

The present invention provides a method for producing a water-absorbent resin by a reversed-phase suspension polymerization method, wherein an odor originating from a raw material component, in particular, a petroleum hydrocarbon dispersion medium, was reduced, and a water-absorbent resin obtained by the method. More specifically, the present invention provides a method for producing a water-absorbent resin comprising performing a reversed-phase suspension polymerization of a water-soluble ethylenically unsaturated monomer in a petroleum hydrocarbon dispersion medium by using a surfactant, wherein an aqueous solution of the water-soluble ethylenically unsaturated monomer is dispersed in the dispersion medium at a specific pouring rate to reduce an odor, and a water-absorbent resin obtained by the method, are provided.

7 Claims, No Drawings

(56) References Cited

OTHER PUBLICATIONS

International Preliminary Report on Patentability (PCT/IB/326) (1 page), (PCT/IB/373) (1 page) of International Application No. PCT/JP2011/066455 mailed Feb. 7, 2013 (Form PCT/ISA/237) (3 pages) (Japanese Only).

US Office Action dated Apr. 9, 2013, issued in U.S. Appl. No. 13/812,695 (15 pages).

International Preliminary Report on Patentability (PCT/IB/326) (1 page), (PCT/IB/373) (1 page) of International Application No. PCT/JP2011/066453 mailed Feb. 7, 2013 (Form PCT/ISA/237) (4 pages) (Japanese Only).

International Preliminary Report on Patentability (PCT/IB/326) (1 page), (PCT/IB/373) (1 page) of International Application No. PCT/JP2011/066454 mailed Feb. 7, 2013 (Form PCT/ISA/237) (3 pages) (Japanese Only).

Translation of the International Preliminary Report on Patentability (PCT/IB/338) (1 page), (PCT/IB/373) (1 page) of International Application No. PCT/JP2011/066456 mailed Mar. 21, 2013 (Form PCT/ISA/237) (4 page).

U.S. Office Action dated May 16, 2014, issued in related U.S. Appl. No. 13/812,753 (17 pages).

U.S. Non-Final Action dated Feb. 20, 2014, issued in related U.S. Appl. No. 13/812,753.

U.S. Notice of Allowance dated Jul. 7, 2014, issued in related U.S. Appl. No. 13/812,695 (13 pages).

\* cited by examiner

METHOD FOR PRODUCING A WATER-ABSORBENT RESIN

TECHNICAL FIELD

The present invention relates to a method for producing a water-absorbent resin by a reversed-phase suspension polymerization method, wherein an odor originating from a raw material component, in particular, a petroleum hydrocarbon dispersion medium, was reduced, and to a water-absorbent resin obtained by the method.

BACKGROUND ART

Water-absorbent resins are widely used in hygienic materials such as disposable diapers and sanitary napkins; daily commodities such as pet sheets; water absorbing sheets for food products; industrial materials such as water blocking materials for cables; water retention agents for greening/agriculture/horticulture; and the like.

Hygienic materials such as disposable diapers and sanitary napkins are generally constituted with a top sheet, a back sheet, a hot melt adhesive, an elastic material, a water-absorbent resin and a pulp fiber, various synthetic resins and modifiers are used. Therefore, an odor originating from raw material components is perceived from the hygienic materials, in some cases. Since these hygienic materials are put on the human body, the odor makes users uncomfortable even if it is subtle and, therefore, it is desired to develop an odor-free material.

Among constituent materials of these hygienic materials, the water-absorbent resin has a subtle odor originating from the substances used in the production process, and since the odor tends to emit upon water absorption, it is considered to be desirable to reduce the odor.

As water-absorbent resins used for hygienic materials, for example, a partially-neutralized product of polyacrylic acid, a neutralized product of a starch-acrylic acid graft polymer, a hydrolysate of a starch-acrylonitrile graft copolymer, a saponified product of a vinyl acetate-acrylic acid ester copolymer are known.

As methods for producing such water-absorbent resins, an aqueous polymerization method and a reversed-phase suspension polymerization method are known. In a case where a water-absorbent resin is produced by a reversed-phase suspension polymerization method in which polymerization is performed by suspending a water-soluble monomer in a dispersion medium, a major cause of the odor is considered to originate from the dispersion medium.

As conventional methods for producing the water-absorbent resin by a reversed-phase suspension polymerization method, known are a method of polymerizing an aqueous solution of α,β-unsaturated carboxylic acid and alkali metal salt thereof in a petroleum hydrocarbon solvent using a radical polymerization initiator in the presence or absence of a internal-crosslinking agent in which a sucrose fatty acid ester is used as a protective colloid agent (see Patent Document 1), and a method of polymerizing a 25% by mass or more of aqueous solution of an α,β-unsaturated carboxylic acid and alkali metal salt thereof in a petroleum hydrocarbon solvent using a radical polymerization initiator in the presence or absence of a internal-crosslinking agent in which a polyglyceryl fatty acid ester with an HLB of 2 to 16 is used as a surfactant (see Patent Document 2). However, these production methods do not focus on reduction of an odor, and thus odors of the resultant water-absorbent resins are not sufficiently low.

REFERENCE DOCUMENTS

Patent Documents

[Patent Document 1] JP-A No. 61-87702
[Patent Document 2] JP-A No. 62-172006

SUMMARY OF THE INVENTION

Problems to be Solved by the Invention

An object of the present invention is to provide a method for producing a water-absorbent resin by a reversed-phase suspension polymerization method, wherein an odor originating from a raw material component, in particular, a petroleum hydrocarbon dispersion medium, was further reduced, and to a water-absorbent resin obtained by the method.

Means for Solving the Problems

The present inventors intensively studied about a relation between an odor originating from a petroleum hydrocarbon dispersion medium when the water-absorbent resin absorbs water, and a petroleum hydrocarbon dispersion medium used in production of the water-absorbent and, as a result, found out to be able to provide a method for producing a water-absorbent resin having a further reduced odor as well as a water-absorbent resin produced by the same method, by dispersing the water-soluble ethylenically unsaturated monomer in the dispersion medium at a specific addition rate, in a method for the reversed-phase suspension polymerization of water-soluble ethylenically unsaturated monomer by using a surfactant in a petroleum hydrocarbon dispersion medium.

That is, the present invention relates to a method for producing a water-absorbent resin shown below, and a water-absorbent resin obtained by the method.

Item 1. A method for producing a water-absorbent resin comprising performing a reversed-phase suspension polymerization of a water-soluble ethylenically unsaturated monomer in a petroleum hydrocarbon dispersion medium by using a surfactant, a pouring rate upon dispersing an aqueous solution of the water-soluble ethylenically unsaturated monomer in the dispersion medium, is satisfied with the following conditions:

(a) an addition rate $V_i$ of the aqueous solution is 0.30 [min$^{-1}$] or less upon dispersing an aqueous solution of the water-soluble ethylenically unsaturated monomer in the dispersion medium, wherein the addition rate $V_i$ is defined by Equation (I):

$$V_i = F_i \times A_i / T$$

wherein i: Nozzle number (1 to n), n: Number of nozzles (1≤n≤10), $V_i$: Addition rate [min$^{-1}$], $F_i$: Average linear flow rate from nozzle [m/min], $A_i$: Cross-section area of nozzle [m$^2$], and T: Total amount [m$^3$] of the aqueous monomer solution charged in a polymerization reaction tank; and (b) a total addition rate $V_{total}$ of the aqueous monomer solution of the water-soluble ethylenically unsaturated monomer charged in the polymerization reaction tank, is 0.04 [min$^{-1}$] or more, wherein the total addition rate $V_{total}$ is defined by the following Equation (II):

$$V_{total} = \Sigma V_i \, (i=1 \text{ to } n)$$

wherein $V_{total}$: Total addition rate [min$^{-1}$], $V_i$: Addition rate of each nozzle [min$^{-1}$], and i and n are as defined in Equation (I), incidentally $V_{total}=V_1$ when the polymerization equipment has one nozzle (n=1).

Item 2. A method for producing a water-absorbent resin comprising performing a reversed-phase suspension polymerization of a water-soluble ethylenically unsaturated monomer in a petroleum hydrocarbon dispersion medium by using a surfactant, a pouring rate upon dispersing an aqueous solution of the water-soluble ethylenically unsaturated monomer in the dispersion medium, is satisfied with the following conditions:

(a) an addition rate $V_i$ of the aqueous solution is 0.30 [min$^{-1}$] or less upon dispersing an aqueous solution of the water-soluble ethylenically unsaturated monomer in the dispersion medium, wherein the addition rate $V_i$ is defined by Equation (I):

$$V_i = F_i \times A_i / T$$

wherein i: Nozzle number (1 to n), n: Number of nozzles (1≤n≤10), $V_i$: Addition rate [min$^{-1}$], $F_i$: Average linear flow rate from nozzle [m/min], $A_i$: Cross-section area of nozzle [m$^2$], and T: Total amount [m$^3$] of the aqueous monomer solution charged in a polymerization reaction tank; and (b) a total addition rate $V_{total}$ of the aqueous monomer solution of the water-soluble ethylenically unsaturated monomer charged in the polymerization reaction tank, is 0.08 [min$^{-1}$] or more, wherein the total addition rate $V_{total}$ is defined by the following Equation (II):

$$V_{total} = \Sigma V_i \ (i=1 \text{ to } n)$$

wherein $V_{total}$ Total addition rate [min$^{-1}$], $V_i$: Addition rate of each nozzle [min$^{-1}$], and i and n are as defined in Equation (I), incidentally $V_{total}=V_1$ when the polymerization equipment has one nozzle (n=1).

Item 3. The method for producing water-absorbent resin according to Item 1 or 2, wherein n is 2≤n≤10.

Item 4. The method for producing water-absorbent resin according to any one of Items 1-3, wherein the water-soluble ethylenically unsaturated monomer is dispersed in the petroleum hydrocarbon dispersion medium before the polymerization by using the surfactant, and then the polymerization is performed by using a water-soluble radical polymerization initiator.

Item 5. A water-absorbent resin obtained by the method according to any one of Items 1-4.

Effects of the Invention

According to the present invention, a method for producing a water-absorbent resin, wherein an odor originating from a raw material component, in particular, a petroleum hydrocarbon dispersion medium, is reduced, and a water-absorbent resin obtained by the method are provided.

MODES FOR CARRYING OUT THE INVENTION

The present invention relates to a method for producing a water-absorbent resin comprising performing a reversed-phase suspension polymerization of an aqueous solution of a water-soluble ethylenically unsaturated monomer (hereinafter, an "aqueous monomer solution" means an "aqueous solution of a water-soluble ethylenically unsaturated monomer" unless otherwise expressly indicated) in a petroleum hydrocarbon dispersion medium (hereinafter, a "dispersion medium" means a "petroleum hydrocarbon dispersion medium" unless otherwise expressly indicated) in the presence of a surfactant, wherein the aqueous monomer solution is added at a specific addition rate, and to a water-absorbent resin obtained by the method.

An origin of odor, when a water-abosorbent resin obtained by a reversed-phase suspension polymerization absorbs water, is mainly a dispersion medium remained within particles of the water-abosorbent resin. The present inventors have found out that a mechanism of a dispersion medium remaining in water-absorbent resin particles is caused by generating so-called capsule-like water-absorbent resin particles which include the dispersion medium based on generating a liquid droplet having a shape in which the dispersion medium which is an oil phase is entrapped in a liquid droplet of the aqueous monomer solution, namely, an O/W/O (oil/water/oil) type droplet, and then stabilizing and polymerizing this O/W/O type droplet itself, upon dispersing the aqueous monomer solution in the dispersion medium by means of stirring and the like.

An O/W type droplet herein is an abbreviation of Oil in Water, and refers to a state in which oil droplets are dispersed in water phase. Further, An O/W/O type droplet is an abbreviation of (Oil in Water) in Oil, and refers to a state in which fine oil droplets are dispersed in water droplets, and the water droplets are further dispersed in an oil phase. Namely, it is constituted of an innermost oil phase/an intermediate water phase/an outermost oil phase. In the present invention, the O/W/O type droplet exhibits a state in which droplets of the aqueous solution of the monomer (water phase) contain smaller droplets of dispersion medium (oil phase).

Then, the present inventors focus attention on steps of adding, mixing and dispersing an aqueous monomer solution, and examine how to prevent the generation of the above-mentioned dispersion-medium intension type droplet in a dispersion medium, and as a result, the present inventors proceeded with a study on the relationship between the linear flow rate and the amount of the remaining dispersion medium by focusing the linear flow rate of the aqueous monomer solution charged from the nozzles as an index of the vigor of pouring based on a phenomenon that the amount of the remaining dispersion medium is increased when the aqueous monomer solution is vigorously added from the pouring nozzle for providing the aqueous monomer solution. However, since examples in which the amount of the remaining dispersion medium is not reduced were observed even if the linear flow rate is decreased, the present inventors proceeded with a further study, and as a result, when the addition rate $V_i$ defined in the present application for a pouring nozzle was estimated upon providing an aqueous solution of the water-soluble ethylenically unsaturated monomer to a polymerization tank, the present inventors found out that the amount of the remaining dispersion medium is reduced when the rate is 0.30 [min$^{-1}$] or less. The addition rate $V_i$ of the pouring nozzle is defined by following Equation (I).

$$V_i = F_i \times A_i / T \qquad \text{Equation (I)}$$

wherein i: Nozzle number (1 to n), n: Number of nozzles (1≤n≤10), $V_i$: Addition rate [min$^{-1}$], $F_i$: Average linear flow rate from nozzle [m/min], $A_i$: Cross-section area of nozzle [m$^2$], and T: Total amount [m$^3$] of the aqueous monomer solution charged in a polymerization reaction tank.

$F_i$ (average linear flow rate from a nozzle number i) is an index under the influence of how much to run off the aqueous monomer solution to be poured at an input slot (i.e., the nozzle number i). Since a remaining dispersion medium of a water-absorbent resin to be obtained is increased when a pouring rate of the aqueous monomer solution from a pouring nozzle is faster, it is considered that $F_i$ affects the remanence of the dispersion medium as described below. When the pump etc. is used, the value calculated from the flow rate (the volumetric flow rate is divided by cross-sectional area of a pouring nozzle output) is average linear flow rate $F_i$ from a pouring nozzle. Moreover, when the pouring method using gravity etc. was adopted, the amount of an aqueous monomer solution (volume) to be poured was divided by a time which the pouring needs to calculate mean volumetric flow rate, and similarly average linear flow rate $F_i$ was calculated.

$A_i$ (Cross-sectional area of nozzle) is involved with the size of liquid mass (droplet) of the aqueous monomer solution to be poured. When the liquid mass (droplet) is large upon pouring it into a dispersion medium even if the linear flow rate of the aqueous monomer solution is low, an amount of remaining dispersion medium in the water-absorbent resin to be obtained becomes large, and thereby it is considered that $F_i$ affects the remanence of the dispersion medium as described below.

T (total amount of an aqueous monomer solution added to a polymerization reaction tank) is the added amount of the aqueous monomer solution decided depending on a size of the polymerization reaction tank, and polymerization conditions.

$V_i$ (addition rate) is calculated by the above-mentioned equation (I), and a multiplied value of the linear flow rate $F_i$ [m/min] which is an index of the vigor of pouring of an aqueous monomer solution and the cross-sectional area $A_i$ [m$^2$] of the nozzle related to the poured liquid mass (droplet), is divided as a standard by "the total amount of the aqueous monomer solution added to a polymerization reaction tank: T [m$^3$]" decided with each reactor scale to exclude the influence of the scale factor to an addition rate.

On the other hand, when the addition rate $V_i$ of an aqueous monomer solution becomes lower, an amount of the remaining dispersion medium tends to decrease. However, since the time required to add and mix the aqueous monomer solution to the dispersion medium becomes longer, productivity for the reaction system becomes worse. Then, as a method of reducing the amount of the remaining dispersion medium by making the addition rate from a nozzle 0.30 [min$^{-1}$] or less, and without delaying greatly the addition time of the aqueous monomer solution to a polymerization reaction tank, the addition rate of the aqueous monomer solution to a dispersion medium as the whole polymerization reaction tank was secured by providing a plurality of pouring nozzles, having an addition rate of 0.30 [min$^{-1}$] or less, of the aqueous monomer solution to the polymerization reaction tank, and as a result, resolving this problem is one feature of the present invention. Namely, total of the addition rate of each nozzle is defined as $V_{total} = \Sigma V_i$ (i=1–n)[min$^{-1}$] when it is assumed that the number of the nozzle for adding the aqueous monomer solution to the dispersion medium in a polymerization reactor, is n, and $V_{total}$ of 0.04 [min$^{-1}$] or more, and more preferably 0.08 [min$^{-1}$] or more are secured, aggravation of productivity is rendered to be minimum. That is, when $V_{total}$ is less than 0.04 [min$^{-1}$], the amount of the remaining solvent tends to be further reduced. However, the time required for the addition becomes longer, the productivity becomes very worse, and reduction width of the amount of the remaining solvents against the required time becomes small, and as a result, it is not preferable.

Therefore, in the method for producing the water-absorbent resin of the present invention which performs a reversed-phase suspension polymerization of the water-soluble ethylenically unsaturated monomer by using a surfactant in a petroleum hydrocarbon dispersion medium, it is necessary for the addition rate of the aqueous solution of the water-soluble ethylenically unsaturated monomer to satisfy the following conditions: (a) an addition rate $V_i$ of the aqueous solution is 0.30 [min$^{-1}$] or less, and (b) a total addition rate $V_{total}$ of the all above-mentioned nozzles, is 0.04 [min$^{-1}$] or more. In other words, when the addition rate $V_i$ from each nozzle is 0.30 [min$^{-1}$] or less, $V_{total}$ may be 0.3 [min$^{-1}$] or more.

In addition, if a plurality of nozzles of the present invention satisfies with the above-mentioned addition rate conditions, their setting method is not limited. Therefore, one flow path may be branched to a plurality of flow paths near the polymerization reaction tank to provide nozzles at its tip, or to provide a plurality of flow paths from a supply tank.

Although the mechanism in which the amount of the remaining dispersion medium is reduced by making the addition rate $V_i$ from the nozzle of an aqueous monomer solution of 0.30 [min$^{-1}$] or less, is not clear, it is speculated that the generation of O/W/O type droplet is suppressed by reducing the addition rate. More specifically, the addition rate $V_i$ is represented by a multiplied value of two factors as described in the above Equation (I), those factors are (1) Average linear flow rate $F_i$ which represents vigor of pouring an aqueous monomer solution from nozzles and (2) Cross-section area $A_i$ of nozzles which relates to droplet size of an aqueous monomer solution pouring from nozzles.

And, (1) When Average linear flow rate in nozzle is faster, a region where the dispersion medium and the aqueous monomer solution are contacted with each other is vigorously agitated more than an agitation of a stirring impeller, namely, vigorously agitated over the needs, and as a result, it is speculated that generation of O/W/O type droplet is enhanced. Further, (2) When cross-section area of nozzles is larger, droplet size added from the nozzles becomes larger, an aqueous monomer solution-rich region for the dispersion medium is generated, and thereby there is considered a high possibility that the region where an aqueous monomer solution is rich occurs locally against the dispersion medium to generate an O/W type droplet in which the dispersion medium is dispersed in the aqueous monomer solution when droplet size added from nozzles is large. And, it is considered that O/W/O type droplet is generated by further stirring and dispersing the generated O/W type droplet in the dispersion medium. As described previously, O/W/O type droplets are polymerized with maintaining their form, and becomes water-absorbent resin particles including the dispersion medium therein, and the included dispersion medium is detected as a remaining dispersion medium. Therefore, it is speculated that by controlling each of the factors (1) and (2) to a smaller value, a generation amount of O/W/O type droplets is suppressed, and as a result, an amount of the remaining dispersion medium is reduced.

Even if a plurality of nozzles which add an aqueous monomer solution at this low rate is placed, the relationship between the aqueous monomer solution and the dispersion medium which are supplied from each nozzle, is not different from the above-mentioned those. Therefore, it is considered that the amount of the remaining dispersion medium is hardly increased even when $V_{total}$ becomes more than 0.3 [min$^{-1}$] by providing a plurality of nozzles having the addition rate $V_i$ of 0.30 [min$^{-1}$] or less.

However, when the number of installation nozzles increases too much, then reservation of a setting position not only becomes difficult, but also setting cost is increased, an interval with the next nozzle becomes near upon the addition, and it is considered that the effect which locally suppresses the generation of the region where the aqueous monomer solution is rich, is decreased. Therefore, it is considered that ten of the number of nozzles at the maximum are preferred, and four or less of nozzles are more preferred.

Moreover, it is considered that $V_{total}$ is preferably 1.0 [min$^{-1}$] or less, more preferably 0.5 [min$^{-1}$] or less, from a viewpoint of suppressing the generation of the rich region of the aqueous monomer solution within the dispersed system.

An O/W type droplet herein is an abbreviation of Oil in Water, and refers to a state in which oil droplets are dispersed in water phase. Further, An O/W/O type droplet is an abbreviation of (Oil in Water) in Oil, and refers to a state in which fine oil droplets are dispersed in water droplets, and the water droplets are further dispersed in an oil phase. Namely, it is constituted of an innermost oil phase/an intermediate water phase/an outermost oil phase. In the present invention, the O/W/O type droplet exhibits a state in which droplets of the aqueous solution of the monomer (water phase) contain smaller droplets of dispersion medium (oil phase).

Examples of the water-soluble ethylenically unsaturated monomer used for raw material of water-absorbent resin in the present invention include monomers having an acid group, such as (meth)acrylic acid ["(meth)acrylic" means "acrylic" and "methacrylic", the same shall apply hereinafter], 2-(meth)acrylamide-2-methylpropanesulfonic acid and maleic acid, and salts thereof; nonionic unsaturated monomers such as (meth)acrylamide, N,N-dimethyl(meth)acrylamide, 2-hydroxyethyl(meth)acrylate and N-methylol(meth)acrylamide; and amino group-containing unsaturated monomers such as diethylaminoethyl(meth)acrylate and diethylaminopropyl(meth)acrylate, and quaternized monomers thereof. These water-soluble ethylenically unsaturated monomers may be used alone, or two or more kinds of them may be used in combination.

In addition, examples of an alkaline compound used when a monomer having an acid group is neutralized to a salt include compounds of lithium, sodium, potassium and ammonium. More specifically, examples of the alkaline compound include sodium hydroxide, potassium hydroxide, lithium hydroxide, sodium carbonate and ammonium carbonate.

Among water-soluble ethylenically unsaturated monomers, (meth)acrylic acid and a salt thereof are preferable from a viewpoint of industrial availability.

In addition, when the monomer having an acid group is neutralized, a neutralization degree is preferably from 30 to 90 mol % of the acid group of the water-soluble ethylenically unsaturated monomer. When the neutralization degree is less than 30 mol %, the acid group is not easily ionized and water-absorption capacity deteriorates, and therefore it is not preferred. When the neutralization degree is more than 90 mol %, safety issues may arise when used as hygienic materials, and therefore it is not preferred.

In the present invention, a water-soluble ethylenically unsaturated monomer is used as an aqueous solution. The concentration of the monomer in the aqueous solution of a water-soluble ethylenically unsaturated monomer is preferably from 20% by mass to saturation concentration. If necessary, the aqueous solution of a water-soluble ethylenically unsaturated monomer may contain a chain transfer agent and the like.

Examples of the chain transfer agent include compounds such as thiols, thiolic acids, secondary alcohols, hypophosphorous acid and phosphorous acid. These chain transfer agents may be used alone, or two or more kinds of them may be used in combination.

Examples of the thickener include carboxymethylcellulose, hydroxyethyl cellulose, hydroxypropylcellulose, methyl cellulose, polyethylene glycol, polyacrylic acid, a neutralized polyacrylate and polyacrylamide.

Examples of the petroleum hydrocarbon dispersion medium include aliphatic hydrocarbon having a carbon number of 6 to 8, such as n-hexane, n-heptane, 2-methylhexane, 3-methylhexane, 2,3-dimethylpentane, 3-ethylpentane and n-octane; alicyclic hydrocarbons having a carbon number of 6 to 8, such as cyclohexane, methylcyclohexane, cyclopentane, methylcyclopentane, trans-1,2-dimethylcyclopentane, cis-1,3-dimethylcyclopentane and trans-1,3-dimethylcyclopentane; and aromatic hydrocarbons such as benzene, toluene and xylene. Among these hydrocarbon dispersion media, aliphatic hydrocarbons having a carbon number of 6 to 8, such as n-heptane, 2-methylhexane, 3-methylhexane and n-octane; and alicyclic hydrocarbons having a carbon number of 6 to 8, such as cyclohexane, methylcyclopentane and methylcyclohexane are preferably used from viewpoints of easy industrial availability and safety. These hydrocarbon dispersion media may be used alone, or two or more kinds of them may be used in combination. Further, among these hydrocarbon dispersion media, n-heptane and cyclohexane are preferably used from viewpoints of a good state of W/O type reversed suspension, suitable particle size is easily obtained, and easy industrial availability, and stable quality. Further, as an example of a mixture of the above-mentioned hydrocarbon, a commercially available Exxsol heptane (manufactured by Exxon Mobil Co.: containing heptane and isomeric hydrocarbons of 75 to 85%) and the like may be used to obtain a suitable result.

The amount of the petroleum hydrocarbon dispersion medium to be used is usually from 50 to 600 parts by mass, more preferably from 50 to 400 parts by mass, and still more preferably from 50 to 200 parts by mass, based on 100 parts by mass of the aqueous solution of a water-soluble ethylenically unsaturated monomer from a viewpoint of uniformly dispersing of the aqueous solution of a water-soluble ethylenically unsaturated monomer and facilitating control of the polymerization temperature.

In order to obtain more stable polymerized particles and to disperse an aqueous monomer solution in a dispersion medium, a surfactant, and if necessary, a hydrophobic polymeric dispersion agent are used. From a viewpoint that the polymerization is stably completed without abnormality, if the surfactant or the hydrophobic polymeric dispersion agent can exist before polymerizing the aqueous monomer solution to fully disperse the aqueous monomer solution in the dispersion medium to stabilize the droplet and then the polymerization is performed, timing of an addition of it is not limited in particular. Although there is certain exception by taking into consideration current technology, it is common that the surfactant or the hydrophobic polymeric dispersion agent is previously dissolved or dispersed in a petroleum hydrocarbon dispersion medium before adding the aqueous monomer solution.

Examples of the surfactant used to maintain a dispersion stability during the polymerization, include nonionic surfactants such as sorbitan fatty acid ester, polyoxyethylene sorbitan fatty acid ester, polyglyceryl fatty acid ester, polyoxyethylene glyceryl fatty acid ester, sucrose fatty acid ester, sorbitol fatty acid ester, polyoxyethylene sorbitol fatty acid ester, polyoxyethylene alkyl ether, polyoxyethylene alkyl phenyl ether, polyoxyethylene castor oil, polyoxyethylene hydrogenated castor oil, alkyl allyl formaldehyde condensed polyoxyethylene ether, polyoxyethylene polyoxypropyl alkyl ether, polyethylene glycol fatty acid ester, alkyl glucoside, N-alkyl gluconamide, polyoxyethylene fatty acid amide and polyoxyethylene alkylamine; and anionic surfactants such as fatty acid salt, alkylbenzene sulfonate, alkylmethyl taurate, polyoxyethylene alkyl phenyl ether sulfate, polyoxyethylene alkyl ether sulfate, polyoxyethylene alkyl ether sulfonic acid and a salt thereof, polyoxyethylene alkyl phenyl ether phosphoric acid and a salt thereof, and polyoxyethylene alkyl ether phosphoric acid and a salt thereof. These surfactants may be used alone, or two or more kinds of them may be used in combination.

Among these surfactants, at least one kind selected from the group consisting of polyglyceryl fatty acid ester, sucrose fatty acid ester and sorbitan fatty acid ester are preferred from a viewpoint of dispersion stability of the aqueous monomer solution.

The amount of the surfactant to be added is preferably from 0.01 to 5 parts by mass, and more preferably from 0.05 to 3 parts by mass, based on 100 parts by mass of the aqueous solution of a water-soluble ethylenically unsaturated monomer. When the amount of the surfactant to be added is less than 0.01 part by mass, dispersion stability of the aqueous monomer solution deteriorates, and therefore it is not preferred. When the amount of the surfactant to be added is more than 5 parts by mass, it is not economic, being not preferable.

In order to improve the dispersion stability at the polymerization more, a hydrophobic polymeric dispersion agent may be used together with the surfactant. It is preferred to select and use, as the hydrophobic polymeric dispersion agent, those which are dissolved or dispersed in the petroleum hydrocarbon dispersion medium to be used, and examples of the hydrophobic polymeric dispersion agent include those having a viscosity-average molecular weight of 20,000 or less, preferably 10,000 or less, and more preferably 5,000 or less. Specific examples thereof include maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene, an oxidized ethylene-propylene copolymer, an ethylene-acrylic acid copolymer, ethyl cellulose, anhydrous maleinated polybutadiene and anhydrous maleinated EPDM (ethylene/propylene/diene terpolymer).

Among them, at least one kind selected from the group consisting of maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene and an oxidized ethylene-propylene copolymer is preferred.

The amount of the hydrophobic polymeric dispersion agent to be added is preferably from 0 to 5 parts by mass, more preferably from 0.01 to 3 parts, and still more preferably from 0.05 to 2 parts by mass, based on 100 parts by mass of the aqueous solution of a water-soluble ethylenically unsaturated monomer. When the amount of the hydrophobic polymeric dispersion agent to be added is more than 5 parts by mass, it is not economic, being not preferable.

When the aqueous solution of a water-soluble ethylenically unsaturated monomer is added to and dispersed in the petroleum hydrocarbon dispersion medium, the aqueous solution of the water-soluble ethylenically unsaturated monomer is dispersed by stirring. However, stirring conditions vary depending on a desired dispersed droplet diameter and, therefore cannot be determined unconditionally.

The dispersed droplet diameter can be adjusted dispersed droplet diameter can be adjusted by changing a type, size, rotation numbers of a stirring impeller.

It is possible to use, as a stirring impeller, a propeller impeller, a paddle impeller, an anchor impeller, a turbine impeller, a Pfaudler impeller, a ribbon impeller, a FULLZONE impeller (manufactured by Shinko Pantech Co., Ltd.), a MAXBLEND impeller (manufactured by Sumitomo Heavy Industries, Ltd.) and Super-Mix (manufactured by Satake Chemical Equipment Mfg., Ltd.).

In addition, upon adding an aqueous solution of the water-soluble ethylenically unsaturated monomer to a petroleum hydrocarbon dispersion medium, the addition of the aqueous solution of the water-soluble ethylenically unsaturated monomer the component of which was adjusted and mixed must be performed while taking notice of the addition rate of each nozzle from one or more nozzles being 0.30 $[\text{min}^{-1}]$ or less, and the total addition rate being 0.04 $[\text{min}^{-1}]$ or more as the whole addition rate, as described above.

The aqueous monomer solution added at the above-mentioned addition rate is sufficiently stirred within the above-mentioned dispersion medium in the presence of a surfactant, and dispersed to stabilize droplets, and at the same time, it is fully subjected to a nitrogen gas replacement within the system, and then a reversed-phase suspension polymerization is performed by using a water-soluble radical polymerization initiator to obtain the suspension of a hydrous gel-like crosslinked polymer, in the presence of an internal-crosslinking agent, if necessary.

Examples of the water-soluble radical polymerization initiator used in the present application include persulfates such as potassium persulfate, ammonium persulfate and sodium persulfate; peroxides such as hydrogen peroxide; and azo compounds such as 2,2'-azobis(2-amidinopropane)dihydrochloride, 2,2'-azobis[N-(2-carboxyethyl)-2-methylpropiondiamine]tetrahydrate, 2,2'-azobis(1-imino-1-pyrrolidino-2-methylpropane)dihydrochloride and 2,2'-azobis[2-methyl-N-(2-hydroxyethyl)-propionamide].

Among them, potassium persulfate, ammonium persulfate, sodium persulfate and 2,2'-azobis(2-amidinopropane)dihydrochloride are preferred from a viewpoint of availability and easiness of handling.

The water-soluble radical polymerization initiator may be used in combination with reducing agents such as sulfite and ascorbic acid as a redox polymerization initiator.

The amount of the water-soluble radical polymerization initiator to be used is usually from 0.01 to 1 part by mass based on 100 parts by mass of the water-soluble ethylenically unsaturated monomer. When the amount is less than 0.01 part by mass, a polymerization rate decreases, and when the amount is more than 1 part by mass, a rapid polymerization reaction arises. Therefore, both cases are not preferred.

Timing of the addition of the water-soluble radical polymerization initiator is not limited in particular, but it is preferred to previously add the water-soluble radical polymerization initiator to the aqueous solution of the water-soluble ethylenically unsaturated monomer in advance.

Examples of the internal-crosslinking agent used optionally include polyols such as (poly)ethylene glycol ["(poly)" means a case where a prefix "poly" is attached or not, the same shall apply hereinafter], 1,4-butanediol, glycerol and trimethylolpropane; polyunsaturated esters having two or more vinyl groups obtained by reacting polyols with an unsaturated acid such as acrylic acid or methacrylic acid; bisacrylamides such as N,N'-methylenebisacrylamide; and polyglycidyl compounds having two or more glycidyl groups, such as (poly)ethylene glycol diglycidyl ether, (poly)ethylene glycol triglycidyl ether, (poly)glycerol diglycidyl ether, (poly)glycerol triglycidyl ether, (poly) propylene glycol polyglycidyl ether and (poly)glycerol polyglycidyl ether. These internal-crosslinking agents may be used alone, or two or more kinds of them may be used in combination.

The amount of the internal-crosslinking agent to be added is preferably 0 to 3 parts by mass or less, more preferably 0 to 1 part by mass or less, and still more preferably from 0.001 to 0.1 part by mass, based on 100 parts by mass of the water-soluble ethylenically unsaturated monomer. When the amount is more than 3 parts by mass, excess crosslinking arises and water-absorption capability excessively deteriorates, and therefore it is not preferred.

It is preferred that the internal-crosslinking agent is previously added to the aqueous solution of the water-soluble ethylenically unsaturated monomer.

The reaction temperature during reversed-phase suspension polymerization in the present invention varies depending on the kind and amount of the polymerization initiator to be used, and therefore cannot be determined unconditionally. However, it is preferably from 30 to 100° C., and more preferably from 40 to 90° C. When the reaction temperature is lower than 20° C., the degree of polymerization may decrease, and when the reaction temperature is higher than 100° C., a rapid polymerization reaction arises. Therefore, both cases are not preferred.

Thus, the polymerization reaction liquid (suspension of a hydrous gel-like crosslinked polymer) obtained after the reversed-phase suspension polymerization is considered as the first stage of polymerization, and subsequently "multi-stage polymerization" in which the polymerization is repeated once and again, may be performed by adding an aqueous monomer solution. In use for hygienic materials, it is particularly preferred to perform two stages polymerization from a viewpoint of the size and productive efficiency of the resultant water-absorbent resin particles.

The size of particles after the first stage polymerization thus obtained by polymerizing water-soluble ethylenically unsaturated monomers is a median particle size preferably from 20 to 200 μm, more preferably from 30 to 150 μm, and still more preferably from 40 to 100 μm, from a viewpoint that a moderate particle size from a viewpoint of obtaining of a proper aggregated particle size in multi-stage polymerization. In addition, the median particle size of the first stage of polymerized particle can be measured by dehydrating and drying, after completion of the first stage polymerization. (The measuring method is described below)

According to the below-mentioned method when performing two-steps polymerization, the particles obtained by the first stage polymerization can be aggregated obtain a water-absorbent resin suitable for a hygienic material use, having comparatively larger mean particle size.

In this case, it is necessary to reduce a function of a surfactant such that the aqueous monomer solution used for the second stage polymerization does not form an independent droplet. For example, the above-mentioned aggregated particles can be obtained by cooling after the first stage of end of polymerization, and adding the aqueous monomer solution of the second stage polymerization at a temperature at which a surfactant precipitates at least in part.

In addition, if it is a method capable for obtaining the aggregated particles by the addition of the aqueous monomer solution of the second stage polymerization, the method is not limited to the above-mentioned method.

Moreover, the amount of the dispersion medium remaining in a water-absorbent resin can be further reduced by reducing surfactant activity, and then adding the aqueous monomer solution of the second stage polymerization, as mentioned above. It is speculated that by lowering a surface active function of the surfactant, generation of an independent droplet is suppressed as described above, and further that it is suppressed that an aqueous monomer solution at the second stage forms an O/W/O droplet to be stabilized. (Generally, a surface active function of a surfactant is known to stabilize O/W/O droplets).

It is possible to use, as water-soluble ethylenically unsaturated monomers in the second-stage polymerization, the one similar to those exemplified as the water-soluble ethylenically unsaturated monomer in the first stage polymerization. Kinds, neutralization degree and neutralized salt of the monomer, and the concentration of the aqueous monomer solution may be the same as or different from those of the water-soluble ethylenically unsaturated monomer in the first stage polymerization.

The polymerization initiator to be added to an aqueous solution of a water-soluble ethylenically unsaturated monomer for the second stage polymerization can also be used after selecting from those exemplified as the polymerization initiator used in the first stage polymerization.

If necessary, an internal-crosslinking agent and a chain transfer agent may also be added to the aqueous solution of a water-soluble ethylenically unsaturated monomer in the second stage polymerization, and can be used after selecting from those exemplified as the water-soluble ethylenically unsaturated monomer during the first stage polymerization.

The amount of the water-soluble ethylenically unsaturated monomer to be added in the second stage polymerization is preferably from 50 to 300 parts by mass, more preferably from 100 to 200 parts by mass, and still more preferably from 120 to 160 parts by mass, based on 100 parts by mass of the water-soluble ethylenically unsaturated monomer at the first stage from a viewpoint of obtaining appropriate aggregated particles.

For stirring in the second stage of the reversed-phase suspension polymerization, the whole should be mixed uniformly. The aggregated particle size can be changed with the precipitated state of a surfactant, or the amount of the ethylenically unsaturated monomer for the second stage polymerization to that of the ethylenically unsaturated monomer for the first stage polymerization.

For the addition rate of the aqueous monomer solution in the second stage polymerization to a polymerization reaction liquid at the first stage, since the action of a surfactant is reduced as mentioned above not to generate the independent particle, i.e., to make the polymerization particle at the first stage absorb almost, it is preferred that the addition rate per one nozzle from the nozzles is 0.30 [min$^{-1}$] or less, and the total addition rate is 0.04 [min$^{-1}$] or more in order to reconcile both of uniform formation of the aggregated particles and maintenance of productivity although the amount of the remaining dispersion medium is hardly influenced.

In addition, the aggregated particle size of the suitable water-absorbent resin for a hygienic material use, is preferably 200 to 600 μm, still more preferably 250 to 500 μm, and most preferably 300 to 450 μm.

The reaction temperature in reversed-phase suspension polymerization in the second stage polymerization cannot be determined unconditionally because it depends on the kind and amount of the polymerization initiator. However, it is preferably from 30 to 100° C., and more preferably from 40 to 90° C.

When performing of multi-stage polymerization such as two or more stages polymerization, the second stage polymerization can be subsequently read with the third stage or fourth stage polymerization to perform them.

After completion of the reversed-phase suspension polymerization in the first stage, or multi-stages such as the second stage, it is preferred to add a post-crosslinking agent containing two or more functional groups having reactivity with a functional group derived from a water-soluble ethylenically unsaturated monomer during or before a drying step. The crosslinking density of the surface layer of water-absorbent resin particles and various properties such as water-absorption capacity under load, water-absorption rate and gel strength can be enhanced by adding post-crosslinking agent after the polymerization for reaction, and to impart properties suitable for use in hygienic materials.

A post-crosslinking agent to be used in the post-crosslinking reaction is not particularly limited as long as it can react with a functional group derived from the water-soluble ethylenically unsaturated monomer used in the polymerization.

Examples of the post-crosslinking agent to be used include polyols such as ethylene glycol, propylene glycol, 1,4-butanediol, trimethylolpropane, glycerol, polyoxyethylene glycol, polyoxypropylene glycol and polyglycerol; polyglycidyl compounds such as (poly)ethylene glycol diglycidyl ether, (poly)ethylene glycol triglycidyl ether, (poly)glycerol diglycidyl ether, (poly)glycerol triglycidyl ether, (poly)propylene glycol polyglycidyl ether and (poly)glycerol polyglycidyl ether; haloepoxy compounds such as epichlorohydrin, epibromohydrin and α-methylepichlorohydrin; compound having two or more reactive functional groups, for example, isocyanate compounds such as 2,4-tolylene diisocyanate and hexamethylene diisocyanate; oxetane compounds such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol and 3-butyl-3-oxetane ethanol; oxazoline compounds such as 1,2-ethylenebisoxazoline; and carbonate compounds such as ethylene carbonate. These post-crosslinking agents may be used alone, or two or more kinds of them may be used in combination.

Among them, polyglycidyl compounds such as (poly)ethylene glycol diglycidyl ether, (poly)ethylene glycol triglycidyl ether, (poly)glycerol diglycidyl ether, (poly)glycerol triglycidyl ether, (poly)propylene glycol polyglycidyl ether and (poly)glycerol polyglycidyl ether are preferred from a viewpoint of excellent reactivity.

The amount of the post-crosslinking agent to be added is preferably from 0.01 to 5 parts by mass, and more preferably from 0.02 to 3 parts by mass, based on 100 parts by mass of the total amount of the water-soluble ethylenically unsaturated monomer subjected to the polymerization.

When the amount of the post-crosslinking agent to be added is less than 0.01 part by mass, it is impossible to enhance various properties such as water-absorption capacity under load, water-absorption rate and gel strength of the resultant water-absorbent resin, and when the amount to be added is more than 5 parts by mass, water-absorption capacity excessively deteriorates. Therefore both cases are not preferred.

Further, The post-crosslinking agent may be added as it is, or added in a form of an aqueous solution. If necessary, the post-crosslinking agent may be added in a form of an aqueous solution containing a hydrophilic organic solvent. Examples of the hydrophilic organic solvent include lower alcohols such as methyl alcohol, ethyl alcohol, n-propyl alcohol, isopropyl alcohol and propylene glycol; ketones such as acetone and methyl ethyl ketone; ethers such as diethyl ether, dioxane and tetrahydrofuran; amides such as N,N-dimethylformamide; and sulfoxides such as dimethyl sulfoxide. These hydrophilic organic solvents may be used alone, or two or more kinds of them may be used in combination.

The timing of the addition of the post-crosslinking agent may be after completion of the polymerization and is not particularly limited. The post-crosslinking reaction is preferably performed in a drying step after the polymerization in the presence of water at an amount within a range from 1 to 200 parts by mass, more preferably from 5 to 100 parts by mass, and still more preferably from 10 to 50 parts by mass, based on 100 parts by mass of the water-absorbent resin. By adjusting the amount of water during the addition of the post-crosslinking agent, post-crosslinking in the surface layer of particles of the water-absorbent resin can be more suitably performed and excellent water-absorption capability can be exhibited.

The temperature in the post-crosslinking reaction is preferably from 50 to 250° C., more preferably from 60 to 180° C., still more preferably from 60 to 140° C., and most preferably from 70 to 120° C.

In the present invention, a drying step may be performed under a normal pressure or reduced pressure, or may be performed under a gas flow such as nitrogen gas flow in order to enhance drying efficacy. When the drying step is under a normal pressure, a dehydration can be advanced by refluxing only a dispersion medium among the dispersion medium and water which were distilled out of the system by azeotropy. When the drying step is performed under a normal pressure, the drying temperature is preferably from 70 to 250° C., more preferably from 80 to 180° C., still more preferably from 80 to 140° C., and most preferably from 90 to 130° C. When the drying step is performed under reduced pressure, the drying temperature is preferably from 60 to 100° C., and more preferably from 70 to 90° C.

The water content of the water-absorbent resin after drying is 20% by mass or less, and usually preferably 10% by mass or less, from a viewpoint of imparting fluidity. An amorphous silica powder can also be added to the water-absorbent resin so as to improve fluidity.

EXAMPLES

The median particle size, the water content, and the amount of the remaining dispersion medium (amount of petroleum hydrocarbon dispersion medium remaining in water-absorbent resin particles) of water-absorbent resins obtained in the respective Examples and Comparative Examples were evaluated by the following methods.
(1) Median Particle Size A water-absorbent resin (50 g) was passed through a JIS standard sieve having a sieve opening size of 250 μm. The median particle size was measured using a combination of sieves (α) when 50% by mass or more of the resin remaining on the sieve, while using a combination of sieves (β) when less than 50% by mass of the resin remaining on the sieve.

(α) JIS standard sieves were combined in a downward order of; a sieve having a sieve opening size of 850 μm, a sieve having a sieve opening size of 600 μm, a sieve having a sieve opening size of 500 μm, a sieve having a sieve opening size of 425 μm, a sieve having a sieve opening size of 300 μm, a sieve having a sieve opening size of 250 μm, a sieve having a sieve opening size of 150 μm and a tray.

(β) JIS standard sieves were combined in a downward order of; a sieve having a sieve opening size of 425 μm, a sieve having a sieve opening of 250 μm, a sieve having a sieve opening size of 180 μm, a sieve having a sieve opening size of 150 μm, a sieve with a sieve opening size of 106 μm, a sieve with a sieve opening size of 75 μm, a sieve having a sieve opening size of 45 μm and a tray.

About 50 g of the water-absorbent resin was placed on the uppermost sieve of the combination, and classified for 20 minutes using a Rotap-type shaking machine.

After the sieve classification, the mass of the water-absorbent resin remaining on the respective sieves was calculated in terms of mass % based on the total mass of resin, the values were integrated in an order from the resins with a larger particle size, and thereby the relations between the sieve openings and integration values of the mass % of the water-absorbent resin remaining on the sieve were plotted on a logarithmic-probability paper. The plots on the logarithmic-probability paper were connected with a straight line, and the particle size corresponding to integrated mass % of 50% by mass was defined as the median particle size.

(2) Water Content

About 2.5 g of the water-absorbent resin was accurately weighed (X g) into an aluminum cup, and after drying at 105° C. with a hot air dryer for 2 hours, the mass of the dried water-absorbent resin was measured (Y g), and then the water content was calculated by the following equation. Besides, it is assumed that tare mass of the aluminum cup does not change before and after drying.

Water content (%)=$(X-Y)/X \times 100$ (3) Amount of Remaining Dispersion Medium The amount of the petroleum hydrocarbon dispersion medium remaining in the water-absorbent resin was measured using a head-space gas chromatograph.

(a) Formation of Calibration Curve

Approximate 10 g of the petroleum hydrocarbon dispersion medium (hereinafter referred to as a "dispersion medium") used to polymerize a sample for measuring a remaining dispersion medium, is placed into a screw vial or the like to cool the vial with an ice-water bath. Similarly, 80 g of DMF (dimethylformamide) and 60 g of 25% by mass of an aqueous phosphoric acid solution is also cooled with an ice-water bath. (Charging is performed after sufficiently cooling because of transpiration inhibition for the dispersion medium during charging.) 0.2 g of the above dispersion medium was accurately weighed into a 50 ml volumetric screw vial and then the above cooled DMF was added thereto to accurately make 20 g, followed by stirring with a magnetic stirrer bar to obtain Standard sample solution. This standard sample solution was also cooled by the ice-water bath.

In a 20 ml volumetric vial bottle (No. 5, manufactured by Maruemu Corporation), each of 0.01, 0.05, 0.1 and 0.5 g of the above standard sample solution was accurately weighed and the cooled DMF was added thereto to make the amount of contents in each vial bottle to a total amount of 3.8 g (4 ml).

Furthermore, each vial bottle was charged with 5 ml of 25% by mass of the aqueous phosphoric acid solution, sealed and tightened with a septum rubber and an aluminium cap, and then stirring was performed by shaking each the bottle.

In addition, attention has been paid to perform quickly procedures from charging of the sample into the 20-ml volumetric vial to the sealing, to prevent a dispersion medium from transpiring from the vial as possible. Moreover, attention has been paid also to fully cool DMF and 25% by mass of an aqueous phosphoric acid solution such that the dispersion medium did not transpire due to generation of heat at the time of mixing the both reagents, and to fully mix them after sealing with an aluminium cap or the like.

This vial bottle was warmed at 110° C. for 2 hours, and 1 ml of a vapor phase portion was collected such that the vapor phase portion was not cooled, and then it was injected into a gas chromatograph to obtain a chromatogram.

(Use of Head Space Autosampler)

The concentrations of the above Standard sample solutions were calculated based on amount to be charged, and then the amount to be charged of the dispersion medium in each vial bottle was calculated to prepare a calibration curve based on the amount to be charged and a peak area of the chromatogram.

When a mixture of petroleum hydrocarbons was used as the dispersion medium, plural peaks appeared and therefore a calibration curve was prepared based on a total value of the areas and the amount to be charged.

(b) Measurement of Amount of Dispersion Medium Remaining in Sample

About 2 g of a sample to be measured was charged into an aluminum cup and then dried with a hot air dryer at 105° C. for 2 hours to adjust the water content.

Required amounts of DMF and 25% by mass of an aqueous phosphoric acid solution used for the measurement, were also charged into a screw bottle, and cooled with an ice-water bath.

Into a 20 ml volumetric vial bottle (No. 5, manufactured by Maruemu Corporation), 0.10 g of the above sample was accurately weighed, and the bottom of the vial bottle was dipped in an ice bath to cool the vial bottle and the water-absorbent resins. To this vial bottle were added 4 ml of the above cooled DMF and, further 5 ml of 25% by mass of the above cooled aqueous phosphoric acid solution. The vial bottle was quickly tightened by sealing with a septum rubber and an aluminium cap and, then gently shaken to mix. After allowing to stand for 10 min, it was confirmed that the water-absorbent resin in the vial bottle was swelled, the vial bottle was vigorously shaken to agitate the inside strongly. This vial bottle was pre-heated at 110° C. for 2 hours to strongly agitate the inside again after heating.

In addition, attention has been paid to perform quickly procedures from charging of the sample into the 20-ml volumetric vial to the sealing, to prevent a dispersion medium from transpiring from the vial as possible as much as possible.

This vial bottle was warmed at 110° C. for 2 hours, and 1 ml of a vapor phase portion was collected such that the vapor phase portion was not cooled, and then it was injected into a gas chromatograph to obtain a chromatogram.

(Use of Head Space Autosampler)

The amount of the dispersion medium contained in the amount (0.10 g of observed values) of the charged sample was calculated from the calibration curve made based on the peak area of the resultant chromatogram, and then converted into the amount [ppm] of the dispersion medium contained per 1 g of the sample.

The conditions of a gas chromatograph used in the measurement of the amount of the remaining dispersion medium in the present invention are as follows.

Model: GC-14A+HSS2B (HEADSPACE Autosampler) manufactured by Shimadzu Corporation
Filler: Squalane 25% Shimalite (NAW) (101)
80-100 mesh
Column: 3.2 mm in diameter×2 m
Column temperature: 80° C.
Injection port temperature: 180° C.
Detector temperature: 180° C.
Detector: FID
Gas carrier: Nitrogen gas
V$_i$al bottle heating temperature: 110° C.
Syringe setting temperature: 110° C.

The present invention will be described in detail by way of Examples, but the present invention is not limited only to these Examples.

In addition, the specific gravity of the aqueous monomer solution in each example was calculated as 1.15 g/ml.

Comparative Example 1

Into a 500 mL Erlenmeyer flask, 92.0 g of 80% by mass of acrylic acid was charged and neutralized by adding dropwise 102.2 g of 30% by mass sodium hydroxide under stirring while cooling the flask from the outside. To this were added 0.11 g of potassium persulfate, 8.3 mg of ethylene glycol diglycidyl ether and 43.6 g of ion-exchange water to prepare an aqueous solution of a water-soluble ethylenically unsaturated monomer (hereinafter referred to as "aqueous monomer solution").

Into a 2 L volumetric six-necked separable cover and cylindrical separable round-bottom flask (hereinafter referred to as a "round-bottom flask") equipped with a stirrer with one 50 mm in diameter pitched blade paddle impeller, a thermometer, a reflux condenser, a nitrogen gas introducing tube and a ball-head stopper, 342 g of n-heptane was poured. To the round-bottom flask were added 0.92 g of a sucrose fatty acid ester (manufactured by Mitsubishi-Kagaku Foods Corporation, trade name: S-370) as a surfactant and 0.92 g of a maleic anhydride-modified ethylene-propylene copolymer (manufactured by Mitsui Chemicals, Inc., trade name: HIWAX 1105A) as a hydrophobic polymeric dispersion agent, and then this was dissolved by warming up to an inner temperature of 80° C., and air cooled to an inner temperature of 60° C.

The above-mentioned aqueous monomer solution was charged once into the above heptane while stirring them at 500 rpm by using a funnel made of SUS, having an inside diameter of 8 mm at opening at the tip. When a time period required from the start to the end for providing the aqueous monomer solution was measured, the time period was 12 seconds. By converting the aqueous monomer solution 238 g by the specific gravity of 1.15 g/ml, and dividing a volume of 207 ml by 12 sec to obtain a mean volume flow rate upon pouring of 17.3 ml/sec, Cross-sectional area $A_1 = \pi/4 \times 0.8 \times 0.8 = 0.503$ cm$^2$ and Linear flow rate $F_1 = 17.3$ [ml/sec]/0.503 [cm$^2$]×60[sec/min]×0.01 [cm/m]=20.6 [m/min], Addition rate $V_1 = V_{total} = F_1 \times 100$ [m/m]×$A_1$/207 [ml]=5.0 [min$^{-1}$].

The atmosphere in the system was substituted with nitrogen at a flow rate of 200 ml/min for 30 minutes while stirring at 500 rpm and maintaining the inner temperature of the round-bottom flask around 40° C., and a polymerization reaction was performed by warming for 1 hour with a hot water bath at 70° C.

After the polymerization reaction, the reaction suspension was heated using an oil bath at 120° C. and about 114 g of water was removed off from the system by azeotropic distillation while refluxing n-heptane to obtain a dehydrated polymer.

To the resultant dehydrated polymer was added 4.6 g of 2% aqueous solutions of ethylene glycol diglycidyl ether as a post-crosslinking agent to perform a post-crosslinking reaction at 83° C. for 2 hours.

Then, heating is performed using an oil bath at 120° C., heptane and water were removed off from the system by distillation, followed by drying under a nitrogen gas flow to obtain 91 g of a water-absorbent resin. This water-absorbent resin had a median particle size of 56 μm, and a water content of 3%.

Example 1

Into a 500 mL Erlenmeyer flask, 92.0 g of 80% by mass of acrylic acid was charged and neutralized by adding dropwise 102.2 g of 30% by mass sodium hydroxide under stirring while cooling the flask from the outside. To this were added 0.11 g of potassium persulfate, 8.3 mg of ethylene glycol diglycidyl ether and 43.6 g of ion-exchange water to prepare an aqueous solution of a water-soluble ethylenically unsaturated monomer.

Into a 2 L volumetric six-necked separable cover and cylindrical separable round-bottom flask equipped with a stirrer with one 50 mm in diameter pitched blade paddle impeller, a thermometer, a reflux condenser, a nitrogen gas introducing tube and a ball-head stopper, 342 g of n-heptane was poured. To the round-bottom flask were added 0.92 g of a sucrose fatty acid ester (manufactured by Mitsubishi-Kagaku Foods Corporation, trade name: S-370) as a surfactant and 0.92 g of a maleic anhydride-modified ethylene-propylene copolymer (manufactured by Mitsui Chemicals, Inc., trade name: HIWAX 1105A) as a hydrophobic polymeric dispersion agent, and then this was dissolved by warming up to an inner temperature of 80° C., and air cooled to an inner temperature of 60° C.

A nozzle (made of fluororesin tube with an inside diameter of 1 mm) with an inside diameter of 1 mm was attached to the tip of the tube of the tube pump (MASTERFLEX L/S series) previously prepared, the nozzle is fixed to a opening at the six openings of the separable cover, and the above-mentioned aqueous solution of the water-soluble ethylenically unsaturated monomer was added to the above-mentioned heptane stirring at 500 rpm (while keeping in mind that an aqueous monomer solution is not contacted with the wall surface) in a pump flow rate of 42 ml/min (observed separately). (The addition of the total amount of the above-mentioned aqueous monomer solution required about 600 seconds.) From Cross-sectional area $A_1 = \pi/4 \times 0.1 \times 0.1 = 7.85 \times 10^{-3}$ [cm$^2$] Linear flow rate $F_1 = 42$ [ml/min]/(7.85×10$^{-3}$ [cm$^2$])×0.01 [m/cm]=53.5 [m/min], Addition rate $V_1 = V_{total} = F_1 \times 100$ [cm/m]×$A_1$/207 [ml]=0.20 [min$^{-1}$] was calculated at this time.

The atmosphere in the system was substituted with nitrogen at a flow rate of 200 ml/min for 30 minutes while stirring at 500 rpm and maintaining the inner temperature of the round-bottom flask around 40° C., and a polymerization reaction was performed by warming for 1 hour with a hot water bath at 70° C.

After the polymerization reaction, the reaction suspension was heated using an oil bath at 120° C. and about 114 g of water was removed off from the system by azeotropic distillation while refluxing n-heptane to obtain a dehydrated polymer. To the resultant dehydrated polymer was added 4.6 g of 2% aqueous solutions of ethylene glycol diglycidyl ether as a post-crosslinking agent to perform a post-crosslinking reaction at 83° C. for 2 hours.

Then, heating is performed using an oil bath at 120° C., heptane and water were removed off from the system by distillation, followed by drying under a nitrogen gas flow to obtain 92 g of a water-absorbent resin passed through a sieve of 850 μm. This water-absorbent resin had a median particle size of 61 μm, and a water content of 3%.

Example 2

The same operations as those of Example 1 were performed, except that the pump flow rate of 42 ml/min for addition rate of the aqueous monomer solution with a tube pump in Example 1 was substituted with 21 ml/min. The addition rate was 0.10 [min$^{-1}$]. (The addition of the total amount of the above-mentioned aqueous monomer solution required about 600 seconds.)

As a result, the water-absorbent resin 92 g was obtained. This water-absorbent resin had a median particle size of 59 μm, and a water content of 3%.

Comparative Example 2

The same operations as those of Example 1 were performed, except that the pump flow rate of 42 ml/min for addition rate of the aqueous monomer solution with a tube pump in Example 1 was substituted with 166 ml/min. The addition rate was 0.80 [min$^{-1}$]. (The addition of the total amount of the above-mentioned aqueous monomer solution required about 75 seconds.)

As a result, the water-absorbent resin 91 g was obtained. This water-absorbent resin had a median particle size of 58 μm, and a water content of 3%.

Comparative Example 3

The same operations as those of Example 1 were performed, except that the pump flow rate of 42 ml/min for addition rate of the aqueous monomer solution with a tube pump in Example 1 was substituted with 83 ml/min. (The addition of the total amount of the above-mentioned aqueous monomer solution required about 150 seconds.)

As a result, the water-absorbent resin 91 g was obtained. This water-absorbent resin had a median particle size of 61 μm, and a water content of 2%.

Example 3

The same operations as those of Example 1 were performed, except that two sets of tube pumps which add the aqueous monomer solution at 42 ml/min and nozzles having 1 mm in diameter of Example 1 were prepared respectively, and each nozzle was fixed in the approximately diagonal position for the separable cover to add the aqueous monomer solution from two positions. For both nozzles at this time, from Cross-sectional area $A_1=A_2=\pi/4\times0.1\times0.1=7.85\times10^{-3}$ [cm$^2$], Linear flow rate $F_1=F_2=42$ [ml/min]/$(7.85\times10^{-3}$ [cm$^2$])×0.01 [m/cm]=53.5 [m/min], Addition rate (of each nozzle) $V_1=F_1\times100$ [cm/m]×$A_1/207$ [ml]=0.20 [min$^{-1}$], and $V_2=V_1$, $V_{total}=V_1+V_2$ 0.40 [min$^{-1}$] (The addition of the total amount of the above-mentioned aqueous monomer solution required about 150 seconds.)

As a result, the water-absorbent resin 93 g was obtained. This water-absorbent resin had a median particle size of 58 μm, and a water content of 4%.

Comparative Example 4

The same operations as those of Example 1 were performed, except that two sets of tube pumps which add the aqueous monomer solution at 83 ml/min and nozzles having 1 mm in diameter of Comparative Example 3 were prepared respectively, and each nozzle was fixed in the approximately diagonal position for the separable cover to add the aqueous monomer solution from two positions. For both nozzles at this time, from Cross-sectional area $A_1=A_2=\pi/4\times0.1\times0.1=7.85\times10^{-3}$ [cm$^2$], Linear flow rate $F_1=F_2=83$ [ml/min]/$(7.85\times10^{-3}$ [cm$^2$])×0.01 [m/cm]=105.73 [m/min], Addition rate (of each nozzle) $V_1=F_1\times100$ [cm/m]×$A_1/207$ [ml]=0.40 [min$^{-1}$], and $V_2=V_1$, $V_{total}=V_1+V_2$ 0.80 [min$^{-1}$] (The addition of the total amount of the above-mentioned aqueous monomer solution required about 75 seconds.)

As a result, the water-absorbent resin 92 g was obtained. This water-absorbent resin had a median particle size of 58 μm, and a water content of 3%.

Example 4

The same operations as those of Example 1 were performed, except that four sets of tube pumps which add the aqueous monomer solution at 21 ml/min and nozzles having 1 mm in diameter of Example 2 were prepared respectively, and the four nozzles were fixed at an opening of the separable cover (while keeping in mind that aqueous monomer solutions exhausted from the nozzles is not contacted with each other on the liquid surface of heptane) to add the aqueous monomer solution from four positions simultaneously. For each nozzle at this time, from Cross-sectional area $A_1=A_2=A_3=A_4=\pi/4\times0.1\times0.1=7.85\times10^{-3}$ [cm$^2$], Linear flow rate $F_1=F_2=F_3=F_4=21$ [ml/min]/$(7.85\times10^{-3}$ [cm$^2$])×0.01 [m/cm]=26.75 [m/min], Addition rate $V_1=F_1\times100$ [cm/m]× $A_1/207$ [ml]=0.10 [min$^{-1}$], and $V_4=V_3=V_2=V_1$, Total addition rate $V_{total}=\Sigma(V_1$ to $V_4)=0.40$ [min$^{-1}$] was calculated. (The addition of the total amount of the above-mentioned aqueous monomer solution required about 150 seconds.) (The addition of the total amount of the above-mentioned aqueous monomer solution required about 150 seconds.)

As a result, the water-absorbent resin 91 g was obtained. This water-absorbent resin had a median particle size of 58 μm, and a water content of 2%.

Example 5

The same operations as those of Comparative Example 1 were performed, except that the tip of the funnel made of SUS having an inside diameter of 8 mm at the opening of the tip used in Comparative Example 1 was covered with a cap, the tip of which has one opened aperture having an inside diameter of 1 mm (it was confirmed that the liquid poured in the funnel was added to heptane under the funnel through only this aperture having 1 mm in diameter), to throw the above-mentioned aqueous monomer solution into heptane.

In addition, when a time period required from the start to the end for providing the aqueous monomer solution was measured by using a stopwatch, the time period was 260 seconds. By converting the aqueous monomer solution 238 g by the specific gravity of 1.15 g/ml, and dividing a volume of 207 ml by 260 sec to obtain a mean volume flow rate of 0.80 ml/sec, from Cross-sectional area $A_1=\pi/4\times0.1\times0.1=7.85\times10^{-3}$ [cm$^2$], Linear addition rate $F_1=0.80$ [ml/sec]/$(7.85\times10^{-3}$ [cm$^2$])×0.01 [m/cm]×60 [sec/min]=61.15 [m/min] at this time, Addition rate $V_1=V_{total}=F_1\times100$ [cm/m]×$A_1/207=0.23$ [min$^{-1}$] was calculated.

As a result, the water-absorbent resin 92 g was obtained. This water-absorbent resin had a median particle size of 60 μm, and a water content of 3%.

Comparative Example 5

The same operations as those of Comparative Example 3 were performed, except that the an inside diameter of 1 mm for the nozzles at the tip of the tube pump was changed to 2 mm in diameter. From Cross-sectional area $A_1=\pi/4\times0.2\times0.2=3.14\times10^{-2}$ [cm$^2$], and Linear flow rate $F_1=83$ [ml/min]/$(3.14\times10^{-2}$ [cm$^2$])×0.01 [m/cm]=26.43 [m/min], Addition rate $V_1=V_{total}=F_1\times100$ [cm/m]×$A_1/207$ [ml]=0.40 [min$^{-1}$] was calculated at this time. (Although the linear flow rate was comparable as that of Example 2, the addition rate is the same as in Comparative Example 3, and the addition of the total amount of the above-mentioned aqueous monomer solution required about 150 seconds.)

As a result, the water-absorbent resin 91 g was obtained. This water-absorbent resin had a median particle size of 56 μm, and a water content of 2%.

Example 6

Into a 500 mL Erlenmeyer flask, 92.0 g of 80% by mass of acrylic acid was charged and neutralized by adding dropwise 102.2 g of 30% by mass sodium hydroxide under stirring while cooling the flask from the outside. To this were added 0.11 g of potassium persulfate, 8.3 mg of ethylene glycol diglycidyl ether and 43.6 g of ion-exchange water to prepare an aqueous solution of a water-soluble ethylenically unsaturated monomer.

Into a 2 L volumetric six-necked separable cover and cylindrical separable round-bottom flask equipped with a stirrer with one 50 mm in diameter pitched blade paddle impeller, a thermometer, a reflux condenser, a nitrogen gas introducing tube and a ball-head stopper, 342 g of n-heptane was poured. To the round-bottom flask were added 0.92 g of a sucrose fatty acid ester (manufactured by Mitsubishi-Kagaku Foods Corporation, trade name: S-370) as a surfactant and 0.92 g of a maleic anhydride-modified ethylene-propylene copolymer (manufactured by Mitsui Chemicals, Inc., trade name: HIWAX 1105A) as a hydrophobic polymeric dispersion agent, and then this was dissolved by warming up to an inner temperature of 80° C., and air cooled to an inner temperature of 60° C.

A nozzle (made of fluororesin tube with an inside diameter of 1 mm) with an inside diameter of 1 mm was attached to the tip of the tube of the tube pump (MASTERFLEX L/S series) previously prepared, the nozzle is fixed to a opening at the six openings of the separable cover, and the above-mentioned aqueous solution of the water-soluble ethylenically unsaturated monomer was added to the above-mentioned heptane stirring at 500 rpm (while keeping in mind that an aqueous monomer solution is not contacted with the wall surface) in a pump flow rate of 11 ml/min (observed separately). (The addition of the total amount of the above-mentioned aqueous monomer solution required about 1150 seconds.) From Cross-sectional area $A_1 = \pi/4 \times 0.1 \times 0.1 = 7.85 \times 10^{-3}$ [cm$^2$], Linear flow rate $F_1 = 11$ [ml/min]/($7.85 \times 10^{-3}$ [cm$^2$])×0.01 [m/cm]=14.0 [m/min], Addition rate $V_1 = V_{total} = F_1 \times 100$ [cm/m]×$A_1/207$ [ml]≈0.05 [min$^{-1}$] was calculated at this time.

The atmosphere in the system was substituted with nitrogen at a flow rate of 200 ml/min for 30 minutes while stirring at 500 rpm and maintaining the inner temperature of the round-bottom flask around 40° C., and a polymerization reaction was performed by warming for 1 hour with a hot water bath at 70° C.

After the polymerization reaction, the reaction suspension was heated using an oil bath at 120° C. and about 113 g of water was removed off from the system by azeotropic distillation while refluxing n-heptane to obtain a dehydrated polymer. To the resultant dehydrated polymer was added 4.6 g of 2% aqueous solutions of ethylene glycol diglycidyl ether as a post-crosslinking agent to perform a post-crosslinking reaction at 83° C. for 2 hours.

Then, heating is performed using an oil bath at 120° C., heptane and water were removed off from the system by distillation, followed by drying under a nitrogen gas flow to obtain 93 g of a water-absorbent resin passed through a sieve of 850 μm. This water-absorbent resin had a median particle size of 60 μm, and a water content of 4%.

Example 7

Two-stage polymerization was performed by using a polymerization according to Example 2 as the first stage polymerization.

Into a 500 mL Erlenmeyer flask, 92.0 g of 80% by mass of acrylic acid was charged and neutralized by adding dropwise 102.2 g of 30% by mass sodium hydroxide under stirring while cooling the flask from the outside. To this were added 0.11 g of potassium persulfate, 8.3 mg of ethylene glycol diglycidyl ether and 43.6 g of ion-exchange water to prepare an aqueous solution of a water-soluble ethylenically unsaturated monomer.

Into a 2 L volumetric six-necked separable cover and cylindrical separable round-bottom flask equipped with a stirrer with one 50 mm in diameter pitched blade paddle impeller, a thermometer, a reflux condenser, a nitrogen gas introducing tube and a ball-head stopper, 342 g of n-heptane was poured. To the round-bottom flask were added 0.92 g of a sucrose fatty acid ester (manufactured by Mitsubishi-Kagaku Foods Corporation, trade name: S-370) as a surfactant and 0.92 g of a maleic anhydride-modified ethylene-propylene copolymer (manufactured by Mitsui Chemicals, Inc., trade name: HIWAX 1105A) as a hydrophobic polymeric dispersion agent, and then this was dissolved by warming up to an inner temperature of 80° C., and air cooled to an inner temperature of 60° C.

A nozzle (made of fluororesin tube with an inside diameter of 1 mm) with an inside diameter of 1 mm was attached to the tip of the tube of the tube pump (MASTERFLEX L/S series) previously prepared, the nozzle is fixed to a opening at the six openings of the separable cover, and the above-mentioned aqueous solution of the water-soluble ethylenically unsaturated monomer was added to the above-mentioned heptane stirring at 500 rpm (while keeping in mind that an aqueous monomer solution is not contacted with the wall surface) in a pump flow rate of 21 ml/min (observed separately). (The addition of the total amount of the above-mentioned aqueous monomer solution required about 600 seconds.) From Cross-sectional area $A_1 = \pi/4 \times 0.1 \times 0.1 = 7.85 \times 10^{-3}$ [cm$^2$] Linear flow rate $F_1 = 21$ [ml/min]/($7.85 \times 10^{-3}$ [cm$^2$])×0.01 [m/cm]=26.8 [m/min], Addition rate $V_1 = V_{total} = F_1 \times 100$ [cm/m]×$A_1/207$ [ml]=0.10 [min$^{-1}$] was calculated at this time.

The atmosphere in the system was substituted with nitrogen at a flow rate of 200 ml/min for 30 minutes while stirring at 500 rpm and maintaining the inner temperature of the round-bottom flask around 40° C., and the first stage polymerization reaction was performed by warming for 1 hour with a hot water bath at 70° C.

After completion of the first stage polymerization, the stirring rate was increased to 1,000 rpm and the inner temperature was cooled to near 25° C. to precipitate at least a part of the surfactant.

Separately, into a 500 mL Erlenmeyer flask, 128.8 g of 80% by mass of acrylic acid was charged and neutralized by adding dropwise 142.9 g of 30% by mass sodium hydroxide under stirring while cooling the flask from the outside. To this were added 0.15 g of potassium persulfate, 11.6 mg of ethylene glycol diglycidyl ether and 16.7 g of ion-exchange water to prepare an aqueous solution of a water-soluble ethylenically unsaturated monomer for the second stage polymerization. Next, for the cooled polymerization liquid, a nozzle (made of fluororesin tube with an inside diameter of 1 mm) with an inside diameter of 1 mm was attached to the tip of the tube of the tube pump (MASTERFLEX L/S series) previously prepared, the nozzle is fixed to a opening at the six openings of the separable cover, and the above-mentioned aqueous solution of the water-soluble ethylenically unsaturated monomer was added to the polymerization liquid stirring at 1,000 rpm (while keeping in mind that an aqueous monomer solution is not contacted with the wall surface) in a pump flow rate of 30 ml/min (observed separately). (The addition of the total amount of the above-mentioned aqueous monomer solution required about 500 seconds.) 288.6 g of the aqueous monomer solution has a specific gravity of 1.17 g/ml and volume is 246.7 ml. From Cross-sectional area $A_1 = \pi/4 \times 0.1 \times 0.1 = 7.85 \times 10^{-3}$ [cm$^2$] = $7.85 \times 10^{-7}$ [cm$^2$], Linear flow rate $F_1 = 30$ [ml/min]/($7.85 \times 10^{-3}$ [cm$^2$])$\times 0.01$ [m/cm]=38.2 [m/min], Addition rate $V_1 = V_{total} = F_1 \times 100$ [cm/m]$\times A_1/246.7$ [ml]=0.12 [min$^{-1}$] was calculated at this time.

Next, the atmosphere in the system was well substituted with nitrogen while maintaining the inner temperature of the round-bottom flask containing the dispersion near room temperature, and a radical polymerization reaction was performed by warming for 1 hour with a hot water bath at 70° C.

After the second stage polymerization reaction, the reaction suspension was heated using an oil bath at 120° C. and about 260 g of water was removed off from the system by azeotropic distillation while refluxing n-heptane into the flask to obtain a dehydrated polymer dispersed in heptane. To the resultant dehydrated polymer dispersed in heptane was added 8.2 g of 2% aqueous solutions of ethylene glycol diglycidyl ether as a post-crosslinking agent to perform a post-crosslinking reaction at 83° C. for 2 hours.

Then, heating is performed using an oil bath at 120° C., n-heptane and water were removed off from the system by distillation, followed by drying under a nitrogen gas flow to obtain 238 g of a water-absorbent resin having in a form of aggregated spherical particles by passing through a sieve of 850 μm. This water-absorbent resin had a median particle size of 367 μm, and a water content of 6%.

of each pouring nozzle was 0.30 [min$^{-1}$] or less and the total addition rate $V_{total}$ was 0.04 [min$^{-1}$] or more, a reduction in the amount of the remaining dispersion medium could be accomplished as compared with Comparative Examples.

INDUSTRIAL APPLICABILITY

The present invention provides a method for producing a water-absorbent resin, wherein an amount of a remaining petroleum hydrocarbon dispersion medium used in a reversed phase suspension polymerization, which is contained in the water-absorbent resin and an odor originated form the petroleum hydrocarbon dispersion medium is reduced, and a water-absorbent resin obtained by the method.

The invention claimed is:

1. A method for producing a water-absorbent resin comprising performing a reversed-phase suspension polymerization of a water-soluble ethylenically unsaturated monomer in a petroleum hydrocarbon dispersion medium by using a surfactant,
  a pouring rate upon dispersing an aqueous solution of the water-soluble ethylenically unsaturated monomer in the dispersion medium, is satisfied with the following conditions:
  (a) an addition rate $V_i$ of the aqueous solution is 0.30 [min$^{-1}$] or less upon dispersing an aqueous solution of the water-soluble ethylenically unsaturated monomer in the dispersion medium, wherein the addition rate [min$^{-1}$] $V_i$ is defined by Equation (I):

$$V_i = F_i \times A_i / T$$

wherein i: Nozzle number (1 to n), n: Number of nozzles (1≤n≤10), $F_i$: Average linear flow rate from nozzle [m/min], $A_i$: Cross-section area of nozzle [m$^2$], and T: Total amount [m$^3$] of the aqueous monomer solution charged in a polymerization reaction tank; and

TABLE 1

Addition conditions of aqueous monomer solution

| | | | | per one nozzle | | | Total | | Amount of |
| --- | --- | --- | --- | --- | --- | --- | --- | --- | --- |
| | Devices | Nozzle diameter mmφ | Numbers of nozzles | Volume flow rate [ml/min] | Linear flow rate [m/min] | Addition rate $V_i$ [min−1] | addition rate $V_{total}$ [min−1] | Particle size [μm] | remaining dispersion medium [ppm] |
| Example 1 | Tube pump | 1 | 1 | 42 | 53.5 | 0.20 | 0.20 | 61 | 4,427 |
| Example 2 | " | 1 | 1 | 21 | 26.8 | 0.10 | 0.10 | 59 | 3,933 |
| Example 3 | " | 1 | 2 | 42 | 53.5 | 0.20 | 0.40 | 58 | 4,765 |
| Example 4 | " | 1 | 4 | 42 | 26.8 | 0.10 | 0.40 | 58 | 4,805 |
| Example 5 | Funnel | 1 | 1 | 48 | 61.2 | 0.23 | 0.23 | 57 | 4,969 |
| Example 6 | Tube pump | 1 | 1 | 11 | 14.0 | 0.05 | 0.05 | 60 | 3,621 |
| Example 7 | Tube pump | 1 | 1 | 21 (30) | 26.8 (38.2) | 0.10 (0.12) | 0.10 (0.12) | 367 | 1,863 |
| Comparative Example 1 | Funnel | 8 | 1 | 1038 | 20.6 | 5.01 | 5.01 | 56 | 20,138 |
| Comparative Example 2 | Tube pump | 1 | 1 | 166 | 211.4 | 0.80 | 0.80 | 58 | 49,873 |
| Comparative Example 3 | " | 1 | 1 | 83 | 105.7 | 0.40 | 0.40 | 61 | 12,340 |
| Comparative Example 4 | " | 1 | 2 | 83 | 105.7 | 0.40 | 0.80 | 58 | 22,064 |
| Comparative Example 5 | " | 2 | 1 | 83 | 26.4 | 0.40 | 0.40 | 56 | 18,990 |

The parenthetic values (in "( )") show conditions for the second stage polymerization.

From Table 1, when for addition rates to the polymerization system of an aqueous monomer solution, the addition rate $V_i$ (b) a total addition rate [min$^{-1}$] $V_{total}$ of the aqueous monomer solution of the water-soluble ethylenically unsaturated monomer charged in the polymerization reaction tank, is 0.04 [min$^{-1}$] or more, wherein the total addition rate [min$^{-1}$] V$_{total}$ is defined by the following Equation (II):

$$V_{total} = \Sigma V_i \,(i=1 \text{ to } n) \text{ polymerization tank}$$

wherein V$_i$: Addition rate of each nozzle [min$^{-1}$], and i and n are as defined in Equation (I), and V$_{total}$=V$_1$ when the polymerization equipment has one nozzle (n=1).

2. A method for producing a water-absorbent resin comprising performing a reversed-phase suspension polymerization of a water-soluble ethylenically unsaturated monomer in a petroleum hydrocarbon dispersion medium by using a surfactant, a pouring rate upon dispersing an aqueous solution of the water-soluble ethylenically unsaturated monomer in the dispersion medium, is satisfied with the following conditions:

(a) an addition rate V$_i$ of the aqueous solution is 0.30 [min$^{-1}$] or less upon dispersing an aqueous solution of the water-soluble ethylenically unsaturated monomer in the dispersion medium, wherein the addition rate V$_i$ [min$^{-1}$] is defined by Equation (I):

$$V_i = F_i \times A_i / T$$

wherein i: Nozzle number (1 to n), n: Number of nozzles (1≤n≤10), F$_i$: Average linear flow rate from nozzle [m/min], A$_i$: Cross-section area of nozzle [m$^2$], and T: Total amount [m$^3$] of the aqueous monomer solution charged in a polymerization reaction tank; and (b) a total addition rate [min$^{-1}$] V$_{total}$ of the aqueous monomer solution of the water-soluble ethylenically unsaturated monomer charged in the polymerization reaction tank, is 0.08 [min$^{-1}$] or more, wherein the total addition rate [min$^{-1}$] V$_{total}$ is defined by the following Equation (II):

$$V_{total} = \Sigma V_i \,(i=1 \text{ to } n) \text{ polymerization tank}$$

wherein V$_i$: Addition rate of each nozzle [min$^{-1}$], and i and n are as defined in Equation (I), and V$_{total}$=V$_1$ when the polymerization equipment has one nozzle (n=1).

3. The method for producing water-absorbent resin according to claim 1, wherein n is 2≤n≤10.

4. The method for producing water-absorbent resin according to claim 1, wherein the water-soluble ethylenically unsaturated monomer is dispersed in the petroleum hydrocarbon dispersion medium before the polymerization by using the surfactant, and then the polymerization is performed by using a water-soluble radical polymerization initiator.

5. The method for producing water-absorbent resin according to claim 2, wherein n is 2≤n≤10.

6. The method for producing water-absorbent resin according to claim 2, wherein the water-soluble ethylenically unsaturated monomer is dispersed in the petroleum hydrocarbon dispersion medium before the polymerization by using the surfactant, and then the polymerization is performed by using a water-soluble radical polymerization initiator.

7. The method for producing water-absorbent resin according to claim 3, wherein the water-soluble ethylenically unsaturated monomer is dispersed in the petroleum hydrocarbon dispersion medium before the polymerization by using the surfactant, and then the polymerization is performed by using a water-soluble radical polymerization initiator.

\* \* \* \* \*

UNITED STATES PATENT AND TRADEMARK OFFICE
CERTIFICATE OF CORRECTION

PATENT NO.         : 8,841,395 B2  
APPLICATION NO.    : 13/812612  
DATED              : September 23, 2014  
INVENTOR(S)        : Hideki Yokoyama et al.

Page 1 of 1

It is certified that error appears in the above-identified patent and that said Letters Patent is hereby corrected as shown below:

In the Claims

Column 25 Line 5 and Column 26 Line 5
Change

$V_{total} = \Sigma V_i$    ($i = 1$ to $n$) polymerization tank

To be $V_{total} = \Sigma V_i$    ($i = 1$ to $n$)

Signed and Sealed this
Twenty-ninth Day of March, 2016

Michelle K. Lee
*Director of the United States Patent and Trademark Office*